May 26, 1936. L. RADO Re. 19,983

CORNER HOLDER FOR PICTURES OR THE LIKE

Original Filed April 9, 1931

Inventor:
Leopold Rado.
By Watson E. Coleman.

Reissued May 26, 1936 Re. 19,983

UNITED STATES PATENT OFFICE 19,983

CORNER HOLDER FOR PICTURES OR THE LIKE

Leopold Rado, Berlin, Germany

Original No. 1,870,528, dated August 9, 1932, Serial No. 528,933, April 9, 1931. Application for reissue March 15, 1933, Serial No. 660,979, and in Germany November 27, 1929

13 Claims. (Cl. 40—158)

This invention relates to a corner holder for pictures or the like in the form of a transparent pocket adapted to be affixed by adhesive to a support or backing.

Known corner holders for this purpose consisting entirely of celluloid are open to the drawback that they cannot be reliably secured by adhesive, as the adhesive does not cling sufficiently to the smooth surface of the celluloid and, further, in consequence of its stiffness, the pocket cannot follow alterations in form of the support, for example, a page of an album.

For gumming such corner holders there can be used only adhesives which dissolve celluloid. The present invention obviates these drawbacks. According to the invention the upper transparent wall of the pocket consists of a non-fibrous cellulose membrane. As a carrier for the layer of adhesive applied to the lower side of the pocket there is employed fibrous material, for example, paper. To affix this corner holder any suitable adhesive may be employed. As a non-fibrous cellulose membrane forming the upper wall of the pocket there may be used with advantage the cellulose hydrate known in commerce by the name "Cellophane", which is very thin and extremely flexible and offers a great resistance to tearing stresses. With the use of this material the application of the adhesive layer to a supplemental ply of fibrous material is very advantageous in that distortion of the non-fibrous cellulose membrane under the influence of the moisture in the adhesive is prevented, so that the corner of the picture or the like inserted into the pocket has a smooth fit on the lower wall of the pocket and the latter has a smooth fit on the support or backing.

In a practical embodiment of the invention to form the lower wall of the pocket the folded over ends of the cellulose membrane forming the upper wall of the pocket are bedded between two plies of the fibrous material and secured thereto by adhesive. In this way there is obtained greater security against formation of creases in the lower wall of the pocket. By being bedded between two plies of fibrous material movement of the cellulose membrane of itself is prevented, even if the moisture in the adhesive penetrates the lower ply of fibrous material and reaches the cellulose membrane. Also there is obtained greater durability of the pocket. To insure a durable connection of the fibrous plies with the cellulose membrane the latter may be provided with perforations at spaced points where the fibrous plies are gummed directly together.

To form the corner holder there may be applied to the ends of a rectangular strip of non-fibrous cellulose membrane, on one or both sides, covering pieces of fibrous material, and thereupon the ends of the strip are folded along two lines disposed at right angles to one another and extending from the middle of one longitudinal edge to the ends of the other uncovered edge portion of said membrane strip. The covered ends of the strip abut directly on one another after folding, so that the lower wall of the pocket thus formed is not interrupted. The covering pieces of fibrous material may be of rectangular form and in this case are so arranged that the uncovered portion of the strip of cellulose membrane has also the form of a rectangle the length of which is twice as great as its width. There is thus obtained a pocket like corner holder in which the lower wall covered with fibrous material and intended to be gummed projects beyond the open end of the pocket in the form of a right-angled triangle. Alternatively, there may be employed covering pieces in the form of right-angled triangles, the arrangement being such that the uncovered portion of the strip of cellulose membrane is given the form of a right-angled isosceles triangle of which the sides disposed at right angles to one another coincide with the lines of fold. In the pocketlike corner holder thereby obtained the triangular lower wall of the pocket is of the same size as the upper wall and is covered over its entire surface with fibrous material.

In order to render possible with simple means the production of corner holders of different sizes in quantity, according to the invention the strips of cellulose membrane covered with fibrous material and intended to be folded are severed to the required size from a web of cellulose membrane and fibrous material secured together by adhesive, the fibrous covering pieces being provided with cutaways corresponding to the form of the uncovered portions of the strip before being gummed to the web of cellulose membrane.

Several embodiments of the invention are illustrated in the accompanying drawing.

Figure 9:
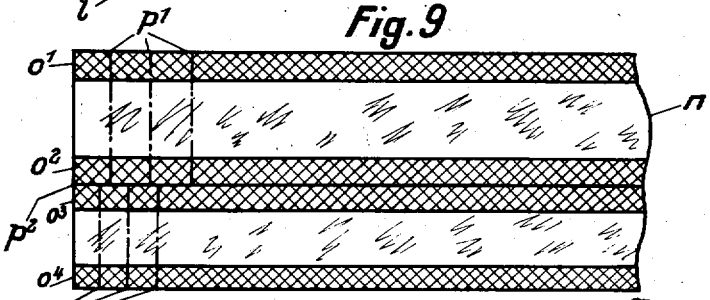
Figure 10:
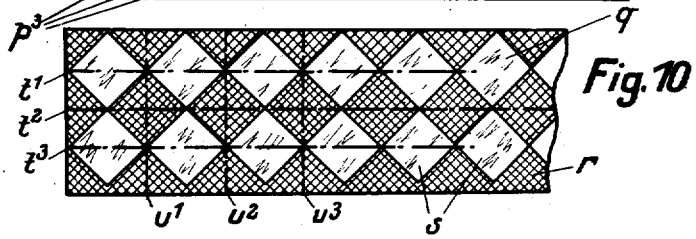

Figs. 9 and 10 each show in plan part of a web of cellulose membrane and fibrous material gummed together, the strips represented in Figs. 3 to 5 or Fig. 7 being formed in different sizes from such webs.

Figure 1:
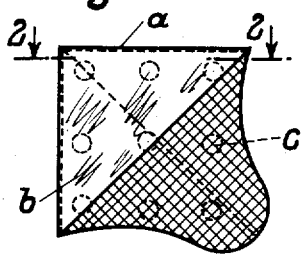
Figs. 1 and 2 show in plan and in cross-section, respectively, a pocket-shaped corner holder in which the lower wall of the pocket is provided on both sides over its entire surface with a fibrous covering.
Figure 2:
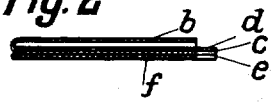

In the embodiment illustrated in Figs. 1 and 2 there is produced by folding a piece of cellulose membrane cut to a suitable shape a pocketlike structure *a*. The upper wall *b* of the pocket has the form of a right-angled isosceles triangle, while the lower wall *c* of the pocket projects in the form of a tongue beyond the edge *b'* of the upper wall. To both sides of the lower wall *c* of the pocket there are gummed covering pieces *d* and *e* of fibrous material. The lower covering piece *e* serves as a carrier for a layer *f* of adhesive. The membrane constituting the lower wall portion is provided with perforations *c'* where the covering pieces *d* and *e* of fibrous material are gummed directly together.

Figure 3:
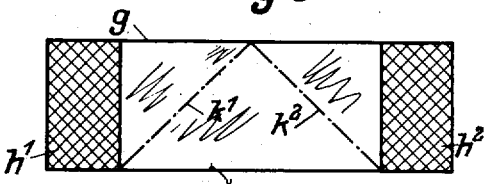
Figs. 3 and 4 show in plan and in cross-section, respectively, a strip of cellulose membrane provided on one side with fibrous covering pieces, the corner holder being folded from this strip.
Figure 4:
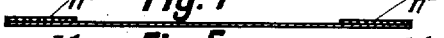
Figure 6:
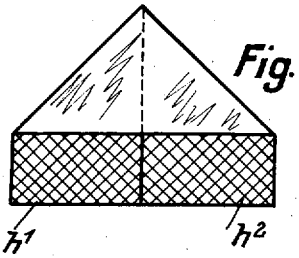
Fig. 6 shows in plan a corner holder produced from the strip according to Figs. 3 and 4 or according to Fig. 5.

The rectangular strip *g* of cellulose membrane shown in Figs. 3 and 4 is provided at both ends on one or both sides with rectangular covering pieces $h^1$ and $h^2$ and $i^1$ and $i^2$ of fibrous material, so arranged that the uncovered portion of the strip *g* is in the form of a rectangle which is of a length twice its width. To form the pocketlike corner holder shown in Fig. 6, the ends of the strip *g* provided with fibrous coverings are folded at the same side along the lines $k^1$, $k^2$ disposed at right angles to one another. These lines $k^1$, $k^2$ extend between the middle of one longitudinal edge and the ends of the other longitudinal edge of the uncovered rectangular portion of the strip *g*. The folded ends of the strip abut with their longitudinal edges directly on one another so that there results the pocket shown in Fig. 6, in which the part of the bottom wall provided with fibrous covering pieces projects beyond the edge of the upper wall of the pocket.

Figure 7:
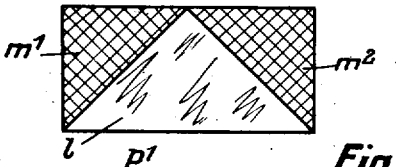
Fig. 7 shows in plan another form of the strip of cellulose membrane provided with fibrous covering pieces and adapted to be folded to form a pocketlike corner holder.
Figure 8:
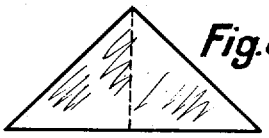
Fig. 8 shows in plan a corner holder formed from the strip shown in Fig. 7.

The strip shown in Fig. 7 consists of a piece *l* of cellulose membrane cut to rectangular form and two fibrous covering members $m^1$ and $m^2$ gummed to one side of said cellulose membrane, said pieces $m^1$ and $m^2$ being in the form of right-angled triangles and so arranged that the uncovered portion of the cellulose membrane *l* is in the form of a right-angled isosceles triangle. To form the pocketlike corner holder shown in Fig. 8, the covered portions of the cellulose membrane are folded over so that the uncovered portion of the cellulose membrane forms the upper wall of the corner holder.

Figure 5:
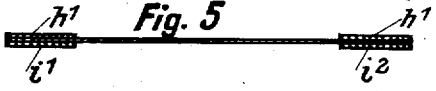
Fig. 5 shows a similar strip of cellulose membrane with fibrous covering pieces on both sides.

For the mass production of strips according to the embodiment shown in Figs. 3 to 5 there may be used the web illustrated in Fig. 9 and consisting of a cellulose membrane *n* and several strips $o^1$, $o^2$, $o^3$, $o^4$ composed of fibrous material and gummed to the membrane in differently spaced relation. This web is preferably divided by a machine into sections along the lines $p^1$, $p^2$, $p^3$, said sections being given different dimensions depending on the desired size of the corner holders to be formed.

The web illustrated in Fig. 10 consists of a cellulose membrane *q* and two webs *r* of fibrous material gummed to both sides of this membrane, said webs *r* being of about the same breadth, and being each provided with two rows of square cutaways of different dimensions. This composite web serves for the mass production of strips according to the embodiment of Fig. 7, the strips being produced by cutting the web along the lines $t^1$, $t^2$, $t^3$ and $u^1$, $u^2$ and $u^3$.

In the embodiment shown in Figs. 3 to 8 the cellulose membrane may be provided with perforations similarly to those provided in the embodiment shown in Fig. 1.

What I claim is:—

1. A corner holder for cards and the like having an upper triangular wall and a lower triangular wall of cellophane, the lower wall having applied to both of its faces a layer of fibrous material, the layers of material being attached to the opposite faces of the under wall, the under wall being perforated at intervals whereby said fibrous layers may be gummed to each other through said perforations.

2. A corner holder for cards and the like having an upper triangular wall and a lower triangular wall of cellophane, the lower wall having applied to both of its faces a layer of fibrous material, the layers of material being attached to the opposite faces of the under wall, the under wall being perforated at intervals whereby said fibrous layers may be gummed to each other through said perforations, the under wall and said fibrous layers extending outward beyond the hypotenuse of the triangular wall.

3. A blank for forming a corner holder for pictures, the blank comprising a rectangular strip of cellophane and layers of fibrous material attached to the ends of said strip, the strip being foldable on diagonal lines intersecting the middle of the strip on one side thereof, and the inner opposite corners of the layers of fibrous material.

4. A blank for forming a corner holder for cards or the like comprising a rectangular strip of cellophane and covering pieces of fibrous material attached to the ends of the cellophane strip and having such width that the uncovered portion of the cellophane strip has the form of a rectangle with a length twice as great as its width.

5. A blank for use in forming corner holders for cards and the like comprising a rectangular strip of cellophane and covering pieces of fibrous material, each having the form of a right angle triangle, the covering pieces being disposed at the ends of said strip whereby the uncovered portion of the cellophane strip has the form of a right angle triangle and the covered portion at the end of each strip has the form of a right angle isosceles triangle of which the sides are disposed at right angles to one another and coincide with the lines of fold of the strip.

6. A blank of the character described, comprising a strip of cellophane having a web of fibrous material adherently applied thereon, the web of fibrous material being formed with cut-out portions defining squares, the composite web so formed being adapted to be cut longitudinally on lines intersecting the middle of said squares and transversely on lines intersecting the junction of said squares and at right angles to the first-named lines.

7. A method of producing a corner holder for cards consisting in attaching to the ends of a strip of cellophane the pieces of fibrous material, then folding the strip along two lines at right angles to one another between the middle of one longitudinal edge and the other longitudinal edge of the uncovered portion of the strip.

8. A method of making corner holders for cards and the like consisting in forming a composite web comprising a strip of cellophane and a strip of fibrous material gummed thereto, the fibrous material covering portions of the cellophane strip but leaving portions of the cellophane strip uncovered, severing the composite strip to form blanks from which the corner piece may be made, and folding said blanks to provide a triangular corner piece having one face thereof of cellophane and one face thereof transparent and the other face thereof provided with covering portions of fibrous material.

9. A corner holder for cards comprising a triangular pocket of transparent membrane and having an upper wall and a lower wall, the pocket having fibrous material attached to its lower face and projecting out beyond the opening in the pocket.

10. A corner holder for cards comprising a triangular pocket of transparent, relatively stiff material, the pocket having an upper wall and a lower wall and having adhesively attached to its lower wall a piece of fibrous material, the material projecting outward beyond the opening of the pocket.

11. A corner pocket of transparent sheet material comprising a right angle triangular area with flaps folded thereunder along the legs of the triangle, and projecting beyond the hypotenuse, and a backing sheet of paper or the like gummed on both sides with the flaps adhesively secured to one side.

12. A corner pocket mounting device composed of a piece of transparent sheet material having two adjacent edges at right angles along which the material is folded upon itself, providing space for the insertion of the corner of a picture card or the like with its adjacent edges stopped by said folds, and with an unbroken triangular portion of the transparent material overlying the face of the card, the two folded edges constituting two sides of said triangle, and the card being introduced by insertion under the third side, the material which is folded under said triangle extending beyond said third side and lying under the card, and means for securing said underlying portion of the material to a mount.

13. A corner pocket composed of sheet material and comprising a right-angle-triangular area with flaps folded thereunder along the legs of the triangle and projecting beyond the hypotenuse, and a backing sheet gummed on both sides having one side adhesively secured to the flaps, leaving its opposite side exposed for adhesive securement to a mount.

LEOPOLD RADO.